United States Patent [19]

Hoepfner et al.

[11] Patent Number: 4,693,063
[45] Date of Patent: Sep. 15, 1987

[54] MATERIAL COLLECTION APPARATUS

[76] Inventors: Thomas L. Hoepfner, 98 Prairiewood Dr.; Keith A. Leistikow, 88 Prairiewood Dr., both of Fargo, N. Dak. 58103

[21] Appl. No.: 897,329

[22] Filed: Aug. 18, 1986

Related U.S. Application Data

[63] Continuation-in-part of Ser. No. 692,657, Jan. 17, 1985, Pat. No. 4,614,080, which is a continuation-in-part of Ser. No. 557,233, Dec. 1, 1983, abandoned.

[51] Int. Cl.⁴ .................... A01D 34/63; A01D 87/10
[52] U.S. Cl. ..................................... 56/16.6; 56/13.3
[58] Field of Search ........................ 56/13.3, 16.6, 12.8

[56] References Cited

U.S. PATENT DOCUMENTS

| Des. 213,328 | 2/1969 | Smith et al. | D15/17 |
|---|---|---|---|
| Des. 250,892 | 1/1979 | Jackson | D15/27 |
| 2,843,991 | 7/1958 | Poehls | 56/13.3 |
| 2,849,851 | 9/1958 | Haxter | 56/13.4 |
| 3,058,284 | 10/1962 | Anderson | 56/13.3 |
| 3,134,214 | 5/1964 | Shaw | 56/202 |
| 3,367,092 | 2/1968 | Gifford | 56/16.6 |
| 3,657,865 | 4/1972 | Ober | 56/16.6 |
| 3,699,751 | 10/1972 | Ross et al. | 56/11.6 |
| 3,736,736 | 6/1973 | Myers | 56/16.6 |
| 3,778,865 | 12/1973 | Schmidt, Jr. et al. | 56/13.3 |
| 3,783,592 | 1/1974 | Schraut | 56/13.3 |
| 3,795,094 | 3/1974 | Molten et al. | 56/11.6 |
| 3,812,917 | 5/1974 | Strate | 56/11.6 |
| 3,888,072 | 6/1975 | Templeton | 56/13.3 |
| 3,925,968 | 12/1975 | Wagenhals | 56/13.3 |
| 3,987,606 | 10/1976 | Evans | 56/13.3 |
| 4,043,100 | 8/1977 | Aumann et al. | 56/16.5 |
| 4,081,947 | 4/1978 | Szymanis | 56/13.3 |
| 4,095,398 | 6/1978 | Aumann et al. | 56/16.6 |
| 4,104,852 | 8/1978 | Tackett | 56/16.6 |
| 4,106,272 | 8/1978 | Peterson et al. | 56/16.6 |
| 4,114,353 | 9/1978 | Ansbaugh et al. | 56/13.3 |
| 4,188,160 | 2/1980 | Corbett et al. | 56/13.3 |
| 4,193,249 | 3/1980 | Tackett | 56/16.6 |
| 4,317,325 | 3/1982 | Marto | 56/11.6 |
| 4,345,416 | 8/1982 | Cameron | 56/13.3 |
| 4,433,532 | 2/1984 | McCunn | 56/16.6 |
| 4,614,080 | 9/1986 | Hoepfner | 56/16.6 |

OTHER PUBLICATIONS

E-Z Rake, Inc., "E-Z Vac", Lebanon, Ind., OT, 1980, Grasshopper Company—Your Next Mower.
PeCo Brochure—"PeCo Lawn Vacs—John Deere and Dixon ZTR", 1984.

Primary Examiner—Paul J. Hirsch
Attorney, Agent, or Firm—Burd, Bartz & Gutenkauf

[57] ABSTRACT

A rotary lawn mower mounted on a tractor is equipped with a blower operable to move grass clippings and loose debris from the mower into collection bags. The blower has a rotatable impeller located within a housing attached to the side of the mower. A belt and pulley drive connects the horizontal impeller shaft to an upright blade drive shaft of the mower to rotate the impeller concurrently with the grass cutting blades of the mower. A pair of idler pulleys mounted on one or more supports secured to the housing aligned a single endless belt with the vertical pulley on the impeller drive shaft and change the orientation of the belt from horizontal to vertical and back to horizontal as the belt travels around the pulleys mounted on the impeller and blade shafts.

40 Claims, 26 Drawing Figures

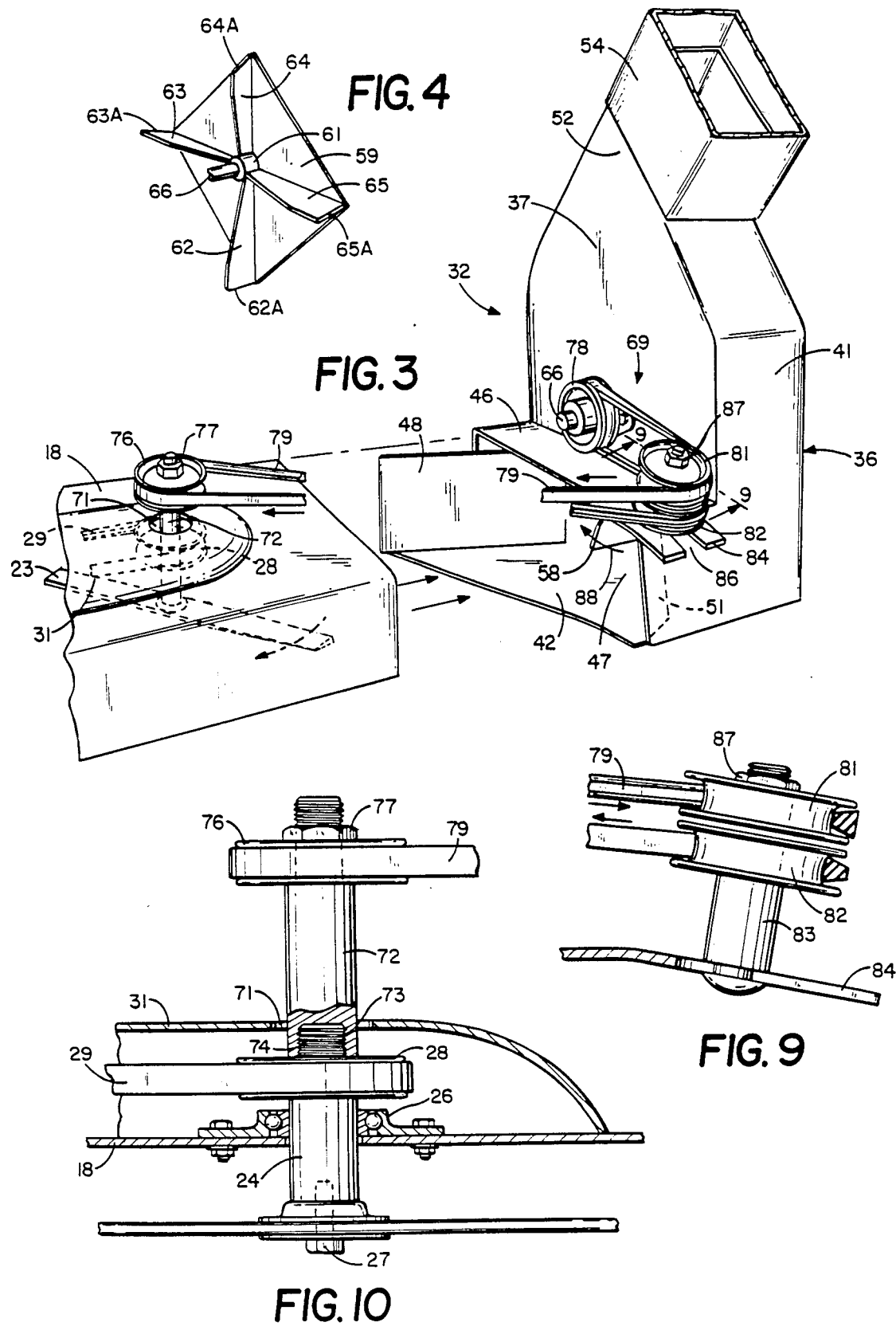

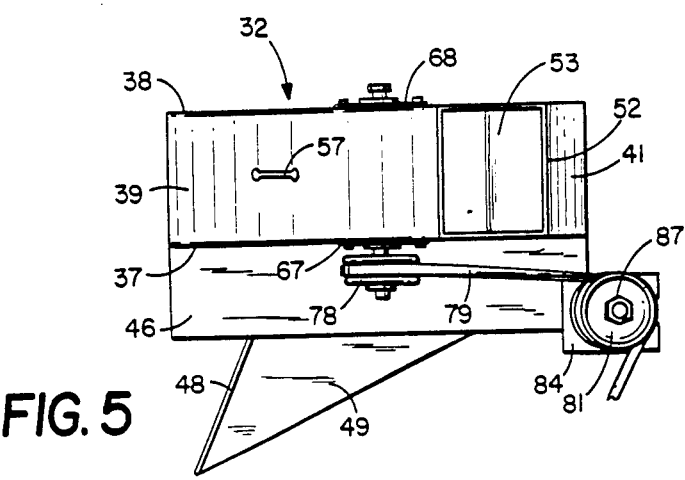
FIG. 5
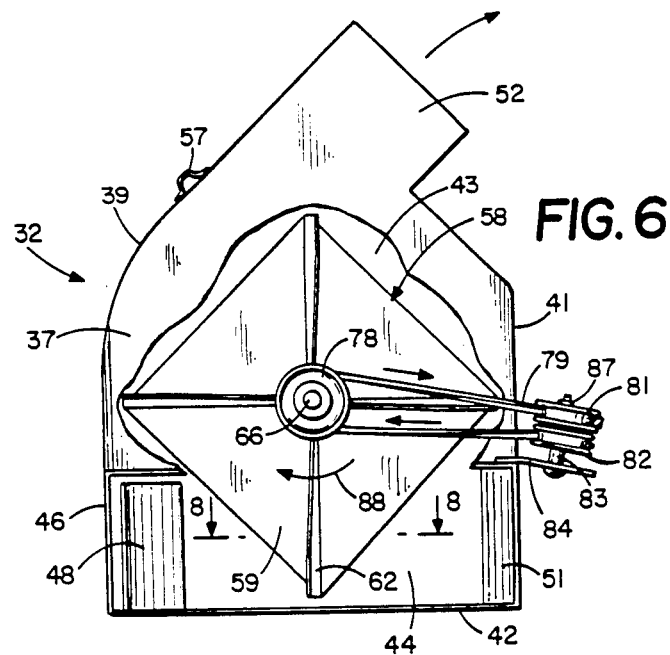
FIG. 6
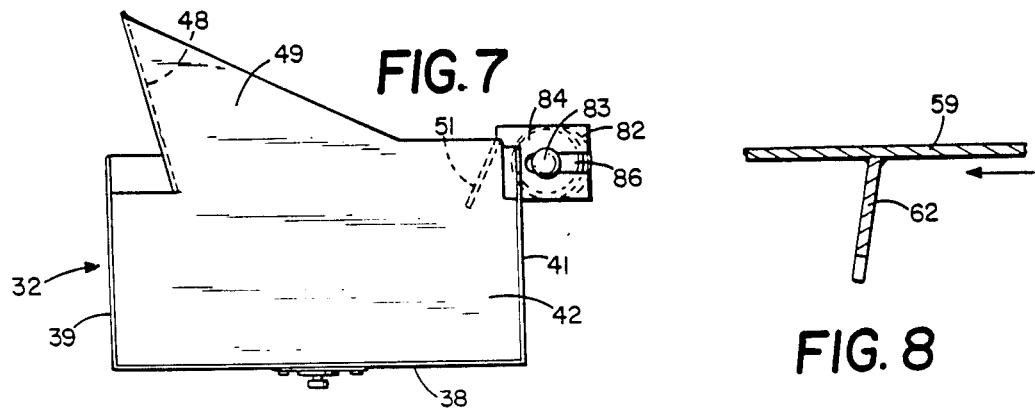
FIG. 7
FIG. 8

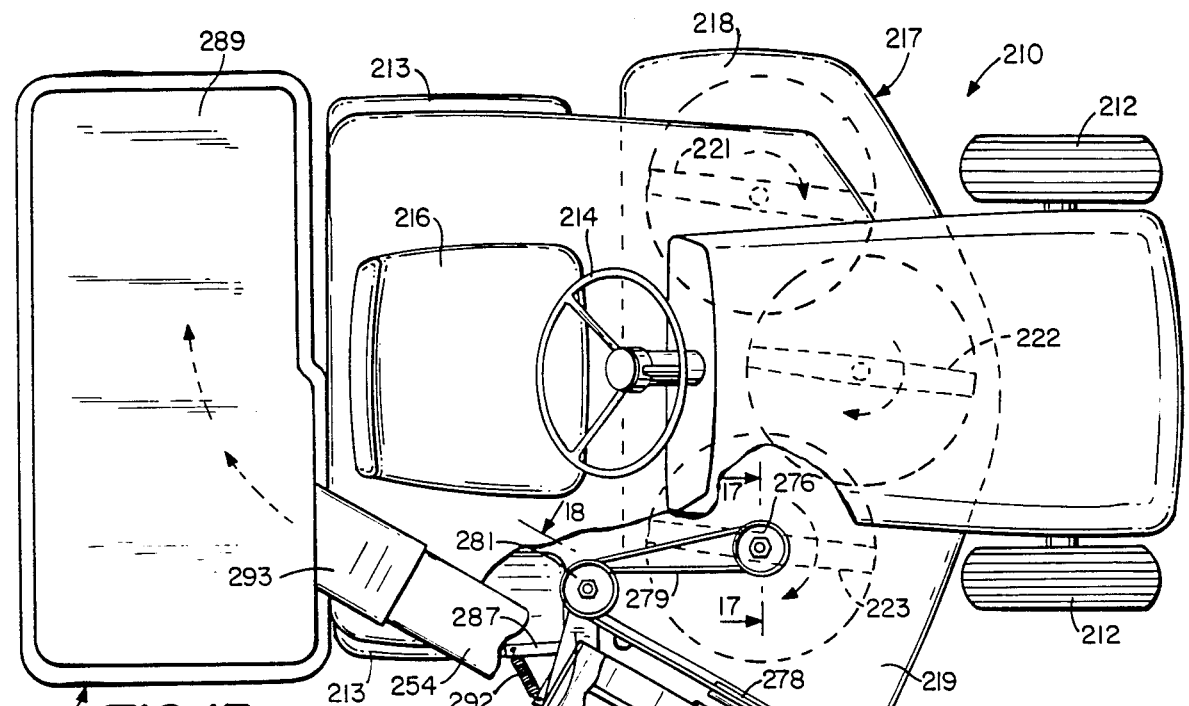
FIG. 15
FIG. 17
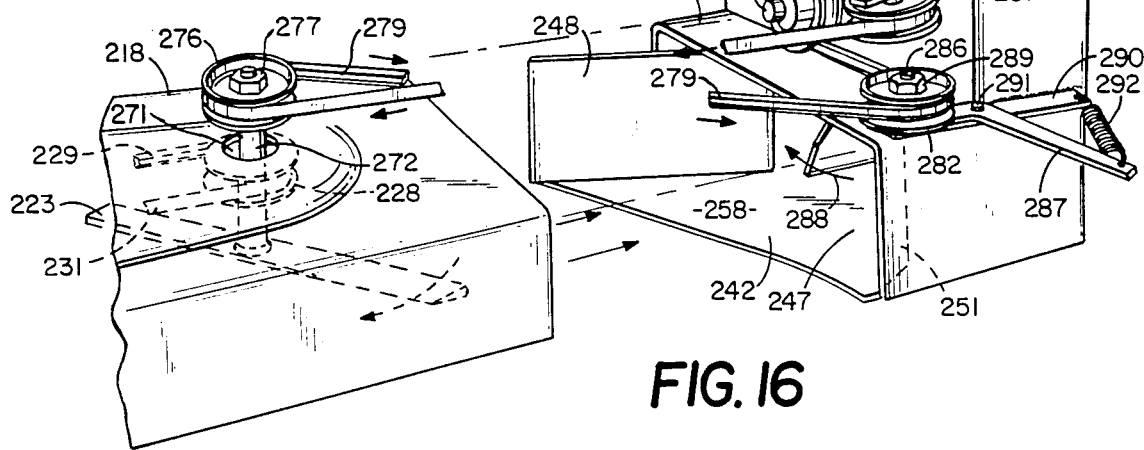
FIG. 16

MATERIAL COLLECTION APPARATUS

CROSS REFERENCE TO RELATED APPLICATIONS

This application is a continuation-in-part of U.S. application Ser. No. 692,657 filed Jan. 17, 1985, now U.S. Pat. No. 4,614,080. Application Ser. No. 692,657 is a continuation-in-part of U.S. application Ser. No. 557,233 filed Dec. 1, 1983, now abandoned.

FIELD OF INVENTION

The invention is in the field of material conveying and collection apparatus operable to move particulate material and a fluid from a first location to a second location. The apparatus is specifically directed for use with a rotary lawn mower for moving grass clippings and loose material from rotary lawn mower into a collection container.

BACKGROUND OF INVENTION

A conventional tractor mounted rotary lawn mower has a generally horizontal deck supporting one or more rotary blades. The deck has a side discharge chute for discharging the grass clippings outwardly from the mower deck. A blower driven by the PTO of the tractor is used to pick up the grass clippings from the side discharge chute and move them into a collection bag. In some installations, a separate internal combustion engine is used to power the blower to draw grass clippings from the side discharge chute and move the clippings along with air into a collection bag. The tractor and blower engines generate considerable noise and require individual servicing and repair. In operation, when the tractor engine is stopped, the blower continues to operate until it is turned off.

Rotary lawn mowers have been equipped with blowers driven by the mower engines for moving grass clippings from adjacent the sides of the decks of the lawn mowers into a collection container. Wagenhals in U.S. Pat. No. 3,925,968 discloses a rotary lawn mower supported by a tractor equipped with a blower for moving grass clippings from the rotary lawn mower into a bag. A combined belt and pulley and gear box drive is used to transmit power from a blade shaft to rotate the fan of the blower. Gear box drives are costly and consume substantial power to rotate the fan.

SUMMARY OF INVENTION

The invention is directed to an apparatus for moving material entrained in a moving fluid from a first location to a desired second location, such as a storage container. The apparatus has a cutting unit adapted to cut material into particles that can flow with a stream of air. The cut material is drawn into a blower unit having a rotatable impeller that transports the material along with air to a collection container. The cutting unit includes one or more rotating cutting blades that are driven from a power source, such as an internal combustion engine. Power transmission means operatively couples a shaft for one of the cutting blades and the impeller of the blower whereby the impeller operates concurrently with the rotation of the cutting blades. The power transmission includes a single endless belt drivably connecting the blade shaft with the impeller. An upright support means having pulley means directs the belt into operative relation relative to a drive pulley on the blade shaft and a driven pulley drivably connected to the impeller. The internal combustion engine for driving the cutting blades concurrently rotates the impeller through the power transmission means so that the material is initially cut by the blades and the cut material is moved into the blower and transported thereby into the collection container.

One form of the apparatus is used for cutting grass and collecting the grass clippings and other loose material into a collector means, such as a bag or container. The apparatus is mounted on a tractor or other vehicles having a power source, such as an internal combustion engine. A rotary lawn mower having a generally horizontal deck is mounted on the tractor. The deck has a grass clippings side discharge section. A plurality of grass cutting blades are rotatably mounted on the deck for cutting grass located below the deck. Blade shafts rotatably mount the blades on the deck. A drive such as a belt and pulley drive is used to transmit power from the engine of the tractor to the blade shafts to rotate the blades whereby the grass under the deck is cut and moved through the discharge opening in the side discharge section of the deck.

A blower means receives the grass clippings from the discharge opening and transports the grass clippings along with air to the collector means. The blower means has a housing with an internal chamber and an inlet opening aligned with the discharge opening of the deck and an outlet opening directed toward the collector means. An upright impeller located within the internal chamber is rotatably mounted on the housing. A horizontal shaft means or impeller shaft rotatably supports the impeller means on the housing for rotation about a transverse generally horizontal axis. Power transmission means drivably connects the horizonal impeller shaft with one upright blade shaft whereby power is transmitted from the drive means for the blades to the impeller to concurrently rotate the impeller with the blades. The deck has a hole above the blade shaft located adjacent the discharge section of the deck. The power transmission means comprises an upright shaft extension extended through the hole and secured to the blade shaft aligned with the hole. A first horizontal pulley is mounted on top of the shaft extension. A second vertical pulley is secured to the shaft means that supports the impeller on the housing. The second pulley is mounted on the inside end of the impeller shaft. In another embodiment, the second pulley is mounted on the outside end of the shaft. In each case, the second pulley accommodates a single endless belt that transmits power to the impeller to rotate the same. An upright post is mounted on a support secured to the housing. Third and fourth pulleys are rotatably mounted on the post. The single endless belt is trained about the first and second pulleys and engages the third and fourth pulleys rotatably mounted on the post. The post is inclined upwardly and away from the axis of rotation of the impeller shaft to rotatably support the third and fourth pulleys about an inclined axis. This locates the third and fourth pulleys at an angle which facilitates the alignment and running of the belt on the first horizontal and second vertical orientated pulleys. The belt follows a general right angle path and transmits power between normally orientated shafts with a minimum loss of power. This power transmission is single, low cost and efficient. The post is adjustably mounted on its support to allow the operator to adjust the tension of the endless belt. A second embodiment of the power transmission means has a support secured to the blower housing. A post mounted on the support rotatably locates a inclined idler pulley in general alignment with the impeller pulley. The power run of the belt is trained about the idler pulley which directs the belt to the drive pulley. A second idler pulley is mounted on a crankarm pivoted to a fixed support. The return run of the belt is located about the second pulley. A spring biases the crankarm in a direction to move the second pulley to maintain tension on the belt.

A third embodiment of the power transmission means has an endless belt that transmits power from the drive pulley to the driven pulley mounted on the outside end of the impeller shaft. A pair of idler pulleys mounted on a support secured to the impeller housing direct the belt around the impeller housing. One of the idler pulleys is rotatably mounted on a post adjustably positioned on the support so that the tension of the belt can be adjusted.

The blower has an impeller that includes a generally vertical plate and a plurality of generally radial paddles secured to one side of the plate. The impeller is located within the blower housing between the upright side walls thereof. One of the side walls has an inlet opening in the lower end thereof. An extension having a passage is secured to the one side wall around the inlet opening. Fastening members, as bolts, secure the extension to the mower deck. An upright forwardly inclined baffle with the extension directs grass clippings into the internal chamber of the housing. The rotating impeller creates a suction or vacuum pressure that draws the grass clippings from under the deck of the mower into the internal chamber, and continuously discharges the grass clippings out of the chamber into the collector means. Grass clippings collector means are mounted on the tractor for receiving the grass clippings. The collector means includes a bag which is removably mounted on a support to facilitate the handling of the collected grass clippings.

The grass collection apparatus includes the blower that is attached directly to the discharge section of the mower deck. The impeller is driven in direct relationship to the speed of the cutting blades of the mower. A separate engine is not used to operate the blower. When the clutch for the mower is disengaged, it automatically disengages the drive to the blower. The cost and maintenance of the apparatus materially less than the prior art grass collection apparatuses.

DESCRIPTION OF DRAWING

FIG. 3 is an exploded perspective view of the outlet section of the rotary lawn mower and the blower for moving grass clippings and loose material into a collection container;

FIG. 4 is a perspective view of the impeller of the blower;

FIG. 5 is a top view of the blower;

FIG. 6 is an inside elevational view, with parts broken away, of the blower;

FIG. 7 is a bottom view of the blower;

FIG. 8 is an enlarged sectional view taken along the line 8—8 of FIG. 6;

FIG. 9 is an enlarged sectional view taken along the line 9—9 of FIG. 3;

FIG. 10 is an enlarged sectional view taken along the line 10—10 of FIG. 2;

FIG. 15 is a plan view of the rotary lawn mower equipped with a first modification of the grass conveying and collection apparatus of the invention;

FIG. 16 is an exploded perspective view of the outlet section of the deck of the rotary lawn mower and the blower and endless belt drive for impeller of the blower of FIG. 15;

FIG. 17 is an enlarged sectional view taken along the line 17—17 of FIG. 15;

DESCRIPTION OF PREFERRED EMBODIMENTS

Figure 1:
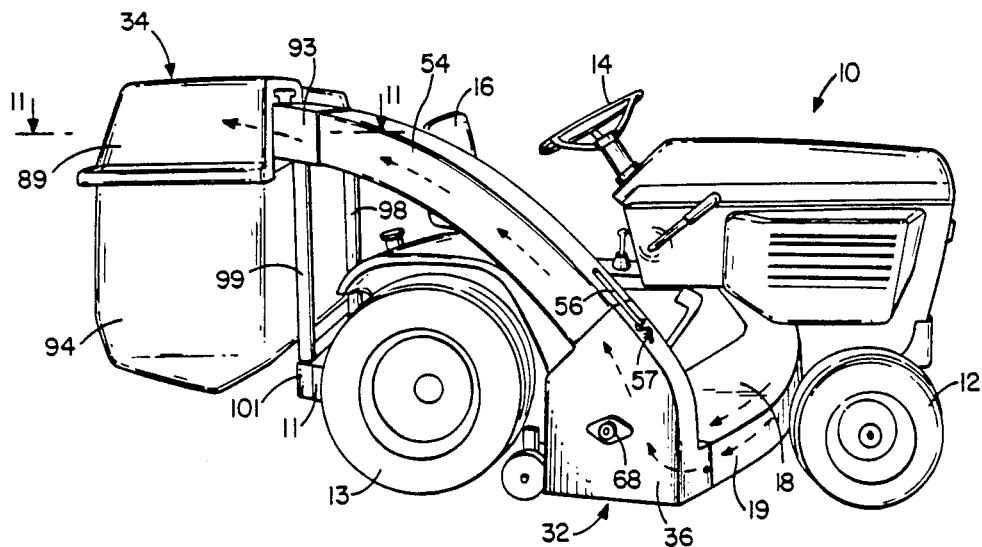
FIG. 1 is a side view of a tractor and rotary lawn mower equipped with a grass conveying and collection apparatus of the invention.
Figure 2:
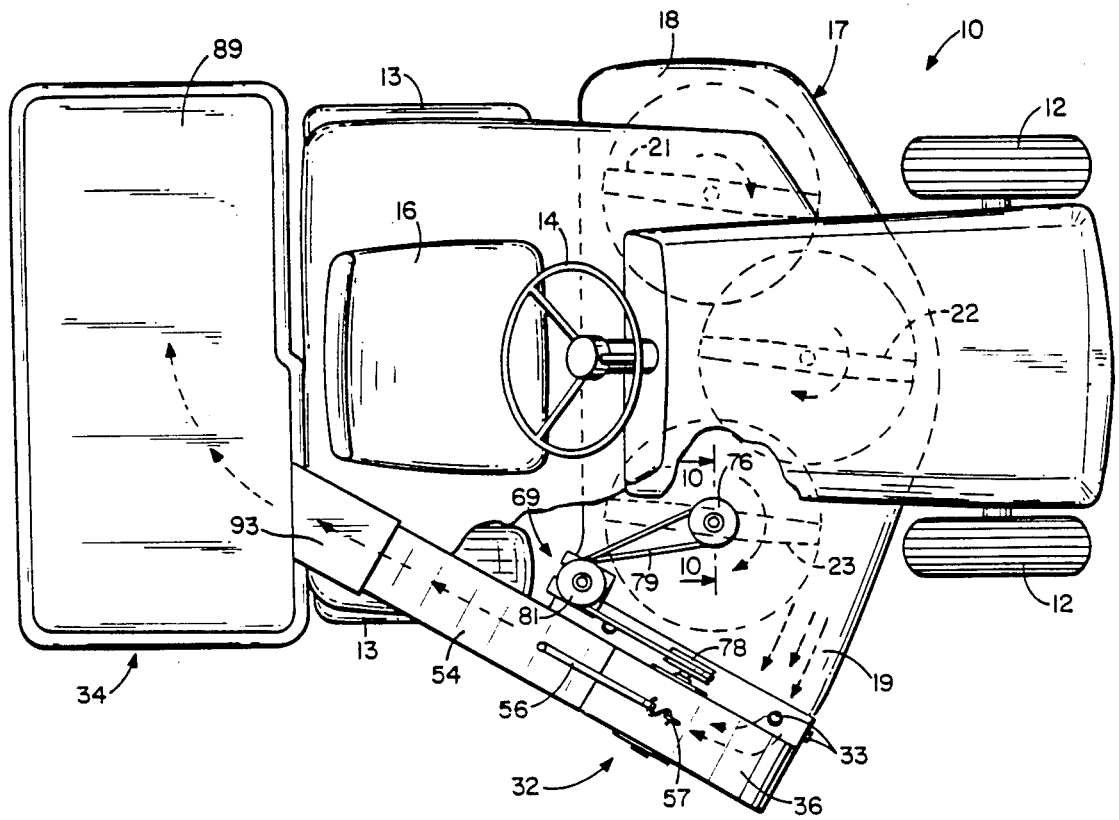
FIG. 2 is a plan view of the rotary lawn mower and grass collector apparatus of FIG. 1.

Referring to FIGS. 1 and 2, there is shown a conventional garden tractor indicated generally at 10. Tractor 10 has a generally horizontal frame 11 supporting front steering wheels 12 and rear drive wheels 13. A steering wheel 14 is located forwardly of the drivers seat 16 to facilitate the operation of the tractor. An internal combustion engine (not shown) functions to drive the rear wheels 13 to move the tractor over the terrain, such as a lawn.

Tractor 10 is equipped with a rotary lawn mower indicated generally at 17. The lawn mower 17 has an inverted panshaped deck 18 located under the frame 11 between the front and rear wheels 12 and 13. Deck 18 has a side discharge section 19. A plurality of cutting blades 21, 22 and 23 are located in the space below deck 18. Blades 21, 22 and 23 are mounted on upright shafts rotatably mounted with bearings (not shown) on deck 18. The shafts for the blades 21, 22 and 23 are drivably connected with an endless belt to the power transmitting structure (not shown) operated by the internal combustion engine. An example of a belt and pulley drive for a plurality of cutting blades on a rotary lawn mower are discharged by Ansbaugh et al in U.S. Pat. No. 4,114,353. The rotary lawn mower including the drive for the rotary cutting blades is conventional structure and does not form a part of the invention.

Referring to FIG. 10, upright blade shaft 24 is rotatably mounted on deck 18 with a bearing 26. A bolt 27 clamps blade 23 to the bottom of shaft 24. A pulley 28 accommodating an endless drive belt 29 is attached to the top of shaft 24. Belt 29 is part of the belt and pulley drive of the rotary lawn mower. A cover or shield 31 mounted on top of deck 18 encloses the belt and pulley drive for the upright blade shafts.

Returning to FIGS. 1 and 2, a blower indicated generally at 32 is located adjacent the discharge end of the side discharge section 19 of the deck. A plurality of nut and bolts 33 secured blower 32 to section 19. Blower 32 operates to draw grass clippings, leaves, twigs, and like loose debris, herein called particulate material, from under deck 18 and discharge the particulate material into a material collector indicated generally at 34. Material collector 34 is mounted on the rear of the frame of the tractor 10 behind seat 16.

Blower 32 includes an upright housing indicated generally at 36 located adjacent the discharge side of deck 18. Housing 36 has a pair of laterally spaced upright side walls 37 and 38 joined to front and rear end walls 39 and 41. A generally flat bottom wall 42 is joined to walls 37, 38, 39, and 41 and provides therewith an interior chamber 43. Side wall 37 has at its lower end a generally rectangular inlet opening 44. The bottom of opening 44 is defined by the flat bottom wall 42. Housing 36 has a lateral inwardly directed extension 46 surrounding the inlet opening 44. Extenion 46 is a generally rectangular structure having an inlet passage 47 in communication with inlet opening 44. A flat inwardly directed deflector plate 48 is mounted on extension 46. As shown in FIG. 5, deflector plate 48 extends at an angle in a forward direction from extension 46. The bottom wall 42 has a generally triangular section 49 that is joined to the bottom of deflector plate 48. Deflector plate 48 fits into the deck discharge section 19 and directs the particulate material into the bottom of interior chamber 43. A second deflector plate 51 is located within extension 46 opposite deflector plate 48. Deflector plates 48 and 51 diverge outwardly or into the chamber 43 to direct the particulate material through the inlet opening 44 into the bottom of interior chamber 43.

The top of housing 36 has an upwardly and rearwardly directed discharge chute 52. Chute 52 has a discharge passage aligned with a tube 54 for carrying the particulate material to collector 34. As shown in FIGS. 1 and 3, tube 54 telescopes over chute 52. A flexible cord 56 attached to tube 54 and hooked to an eye member 57 on housing 36 yieldably holds tube 54 on chute 52.

An impeller indicated generally at 58 is rotatably mounted on housing 36 within interior chamber 43. As shown in FIGS. 4 and 6, impeller 58 has a square upright plate 59 located adjacent wall 36. A cylindrical member or hub 61 is secured to the center of plate 59 and accommodates impeller shaft 66. A set screw (not shown) secures hub 61 to shaft 66. A plurality of paddles 62, 63, 64 and 65 extend from hub 61 to the corners of plates 59. Each paddle 62-65 has a short outwardly directed extension for lip 62A, 63A, 64A, and 65 that projects to the corners of plate 59. As shown in FIG. 8, paddle 62 is inclined in a forward direction relative to the plane of plate 59. Each paddle 63, 64, and 65 have a similar forwardly directed incline. The inclined paddles 62, 63, 64 and 65 are directed toward inlet opening 44. The shaft 66 projects through holes in side walls 37 and 38 and is rotatably mounted on bearings 67 and 68 secured to the side walls. Impeller 58 is driven with a single endless belt and pulley power transmission indicated generally at 69 from blade shaft 24. Cover 31 is provided with a hole 71. Hole 71 is located above blade shaft 24. A shaft extension 72 extends upwardly from blade shaft 24 through hole 71. The lower end of shaft extension 72 has a threaded bore 73 to accommodate the threaded upper end 74 of blade shaft 24. The conventional nut is removed from the threaded end 74 and replaced with the shaft extension 72. A first pulley 76 is mounted on the upper end of shaft extension 72. Nut 77 secures pulleys 76 to shaft extension 72. A second pulley 78 is mounted on the inner end of impeller shaft 66.

An endless belt 79, such as a single V-belt, is trained about the first and second pulleys 76 and 78 to transmit power from the shaft extension 72 to impeller shaft 66. Belt 79 engages a pair of idler pulleys 81 and 82 rotatably mounted on the top of an incline post 83. Post 83 is mounted on a bracket 84 having a rearwardly directed slot 86. As shown in FIG. 9, bracket 84 extends in a downward and rearward direction inclining post 83 away from second pulley 78. Preferably, post 83 is angularly disposed about 5 degrees from a vertical plane away from pulley 78. Post 83 aligns the outer edges of pulleys 81 and 82 with second pulley 78. A nut 87 on top of post 83 is used to secure the post to bracket 84.

The tension of belt 79 is adjusted by adjusting the position of post 83 on bracket 84. This is accomplished by loosening the nut 87 and moving the post on bracket 84 to apply tension to the belt 79. As shown in FIG. 9, the upper run of belt 81 moves over pulley 81 from the top of the second pulley 79 to the power or drive pulley 76. The lower run of belt 79 extends around pulley 82 to the bottom of the second pulley 78. The belt and pulley power transmission 79 efficiently and effectively transmits power from the vertical blade shaft 24 to the horizontal impeller shaft 66. A shield, not shown, is used to enclose the belt and power transmission 69. The impeller 58 is driven in the direction of the arrow 88 to move air and particulate material from under mower deck 18 and discharge the material via tube 54 into material collector 34. Impeller 58 establishes a vacuum or suction that draws the particulate material into the interior chamber 43. The paddles 62, 63, 64 and 65 move the material through the chamber and discharge the material along with air into the tube 54 leading to collector 34. The rotating impeller 58 also functions as a fly wheel to maintain the speed of rotation of the impeller 58 and rotating blades 21, 22 and 23.

Figure 11:
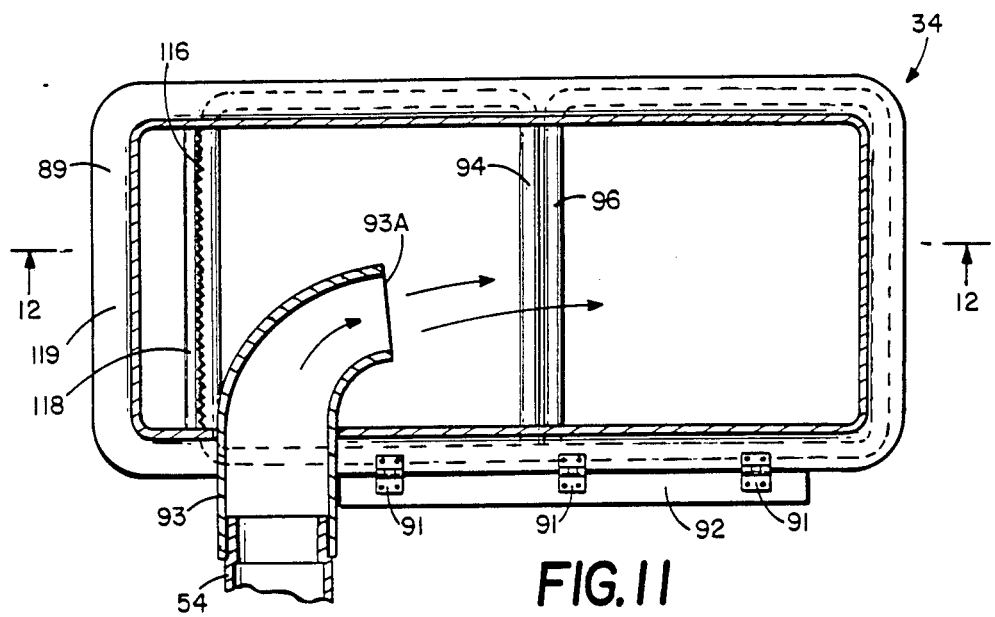
FIG. 11 is an enlarged sectional view taken along the line 11—11 of FIG. 1.

As shown in FIGS. 1, 2 to 11 and 12, collector 34 has an inverted pan-shaped cover 89 pivotally mounted on a transverse frame member 92 with a plurality of hinges 91. Cover 89 can be moved to an upward open position to facilitate the removal of a pair of material containing bags 94 and 96. An elbow 93 extended through an opening in the front side of cover 89 directs material into the downwardly directed bags 94 and 96. Tube 54 telescopes into eblow 93 as shown in FIG. 11. Elbow 93 has a discharge opening 93A directed toward the top of the open bags 94 and 96.

Figure 13:
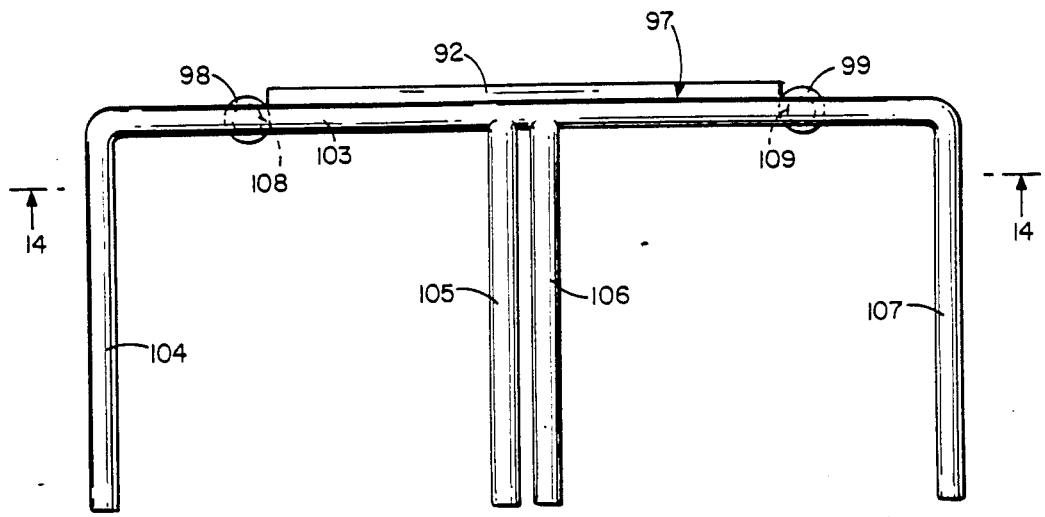
FIG. 13 is a top view of the fork frame for supporting the grass clippings collection bags.
Figure 14:
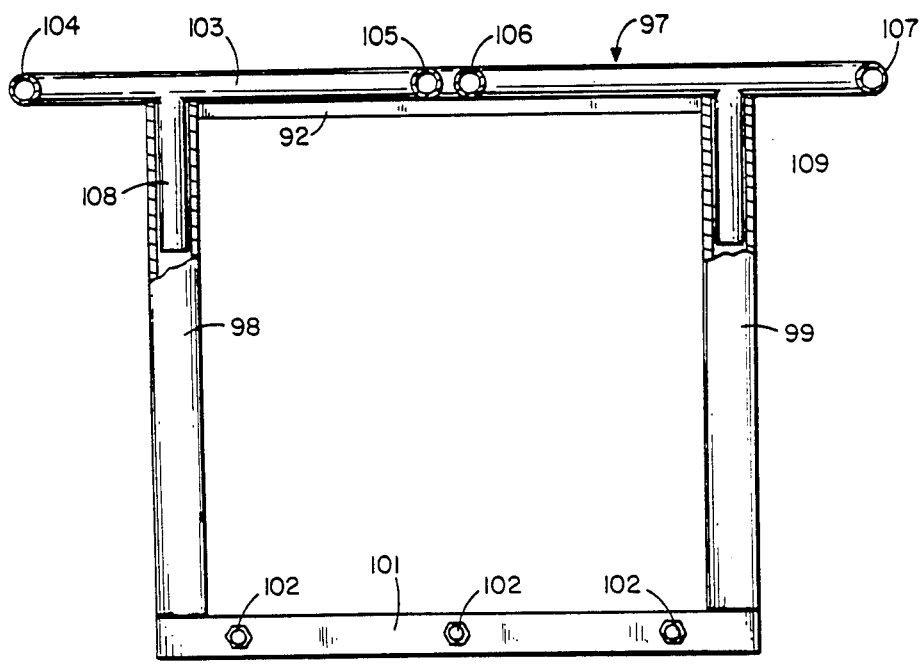
FIG. 14 is a sectional view taken along the line 14—14 of FIG. 13 with parts of the support posts broken away.

The bags 94 and 96 are supported on a fork frame indicated generally at 97, in FIGS. 13 and 14. The fork frame is removably mounted on a pair of upright posts 98 and 99. The posts 98 and 99 are connected to a cross member 101. A plurality of bolts 102 secure the cross member to the frame 11 of tractor 10. The cross member 92 is secured to the top of posts 98 and 99.

As shown in FIGS. 13 and 14, fork member 97 has a cross beam 103 supporting a plurality of rearwardly directed horizontal fingers 104, 105, 106 and 107. Fingers 104–107 are transversely spaced from each other to hold the upper ends of the bags in the open position. A pair of downwardly directed spikes or members 108 and 109 telescope into the open upper ends of the posts 98 and 99 to removably support fork 97 on the posts 98 and 99.

Figure 12:
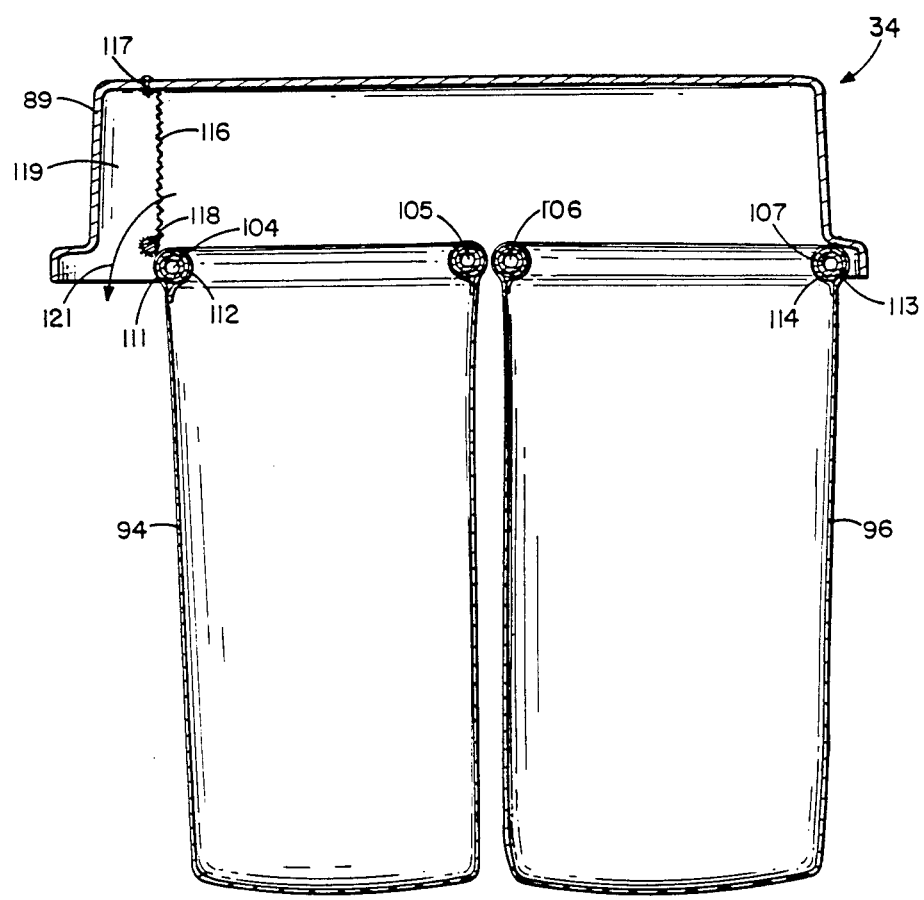
FIG. 12 is a sectional view taken along the line 12—12 of FIG. 11.

As shown in FIG. 12, bag 94 has a top loop 111 accommodating a tube 112. Tube 112 has open ends and is adapted to telescope over the fork fingers 104 and 105 thereby mount bag 94 on the fingers 104 and 105. Bag 96 has a top loop 113 accommodating tube 114. Tube 114 has open ends and is adapted to telescope unto the fork fingers 106 and 107 whereby the bag is removably mounted on the fork fingers 106 and 107.

As shown in FIGS. 11 and 12, cover 89 supports a downwardly directed screen 116. Screeen 116 is located above fork member 104 and provides a barrier which allows the air to flow within the cover 89 to the atmosphere and retain the particulate material in bags 94 and 96. Fasteners 117 secure screen 116 to the top of cover 89. The lower portion of screen 116 is attached to a rod 118 extended and secured to the front and rear wall of the cover. Screen 116 is spaced from the end wall of cover 89 providing a space 119 to allow the air to flow from under the cover as indicated by the arrow 121 in FIG. 12.

In use, blower 32 operates concurrently with the rotation of cutting blades 21, 22 and 23. The internal combustion engine of tractor 10 delivers power to the drive shafts for the cutting blades including drive shaft 24. The belt and pulley transmission 69 operates to continuously transmit power from blade shaft 24 to blower shaft 78. The rotating blades 21, 22 and 23 and blower 32 move air through the space under the deck 18 and the blower 32. The grass under the deck 18 is erected by the moving air and cut with the rotating blades 21, 22 and 23. Blower 32 establishes a suction or vacuum which draws the particulate materials under deck 18 into the interior chamber 43 of the blower housing 36. Impeller 58 picks up the material from the lower portion of chamber 43, elevates the material, and discharges the material through spout 52 into the tube 54. Tube 54 carries the material to elbow 93. The elbow 93 discharges and directs the material into the open tops of bags 94 and 96 as shown in FIG. 11.

The belt and pulley power transmission 69 transmits power from the drive horizontal pulley 76 mounted on the upper end of the extension shaft 72 to the driven material pulley 78 mounted on the inner end of the impeller shaft 66. The vertical axis of rotation of pulley 76 is at right angles to the horizontal axis of rotation of the impeller 66. Endless belt 79 transmits the power from pulley 76 to the impeller pulley 78. The belt 79 is trained about the inclined idler pulleys 81 and 82. The idler pulleys 81 and 82 mounted on post 83 are located in positions to maintain the alignment of the belt 79 with pulleys 76 and 78. This is achieved by rotatably mounting pulleys 81 and 82 on the upper end of the post 83 on an axis that is inclined away from pulley 78. The pulleys 81 and 82 have cylindrical belt engaging faces that are larger than the width of the belt whereby the belt runs at slight angles relative to the cylindrical surfaces of pulleys 81 and 82. This allows the belt to change elevation as it moves around pulleys 81 and 82.

The particulate material is collected in bags 94 and 96. The material is discharged from elbow 93 into the space under cover 89. The material falls into the open top bags 94 and 96. The air flows through screen 116 adjacent the outside of bag 94. The bags 94 and 96 are releasably retained on the fingers 104, 105, and 106, 107. When bags 94 and 96 are full, cover 89 is pivoted to an open position. Bags 94 and 96 are moved rearwardly off the fingers 104, 105 and 106, 107. The material in the bags 94 and 96 is placed in a disposal area, such as a mulch pile. The empty bags are placed back on fingers 104, 105 and 106, 107. Cover 89 is then moved to its closed or down position 89 as shown in FIG. 12. The power to blades 21, 22, and 23 and the blower 32 is disengaged during the emptying of the bags 94 and 96.

FIGS. 15 to 20 show a second embodiment of the grass conveying and collection apparatus for a power rotary lawn mower. Tractor 210 is equipped with a rotary lawn mower indicated generally at 217 having an inverted pan-shaped deck 218 located under a frame 211 extended between the front and rear wheels 212 and 213. Deck 218 has a clipped material side discharge section 219. A plurality of horizontal cutting blades 221, 222, and 223 are located below deck 218. Blades 221, 222, and 223 are mounted on upright shafts rotatably mounted with bearings (not shown) on deck 218. The shafts for the blades 221, 222, and 223 are drivably connected with an endless belt 229 to the power transmitting structure (not shown) operated by the internal combustion engine. The rotary lawn mower including the drive for the rotary cutting blades is conventional structure and does not form part of the invention.

Referring to FIG. 17, upright blade shaft 224 is rotatably mounted on deck 218 with a bearing 226. A bolt 227 clamps blade 223 to the bottom of shaft 224. A pulley 228 accommodating an endless mower drive belt 229 is attached to the top of shaft 224. A cover or shield 231 mounted on top of deck 218 encloses the belt 229 and pulley 228 drive for the upright blade shafts.

Returning to FIG. 15. a blower indicated generally at 232 is located adjacent the side discharge section 219. A plurality of nut and bolts 233 secure blower 232 to section 219. Blower 232 operates to draw particular material, such as grass clippings and the like, from under deck 218 and discharge the particulate material into a material into a material collector indicated generally at 234. Material collector 234 is mounted on the rear of the frame of the tractor 210 behind seat 216.

Figure 18:
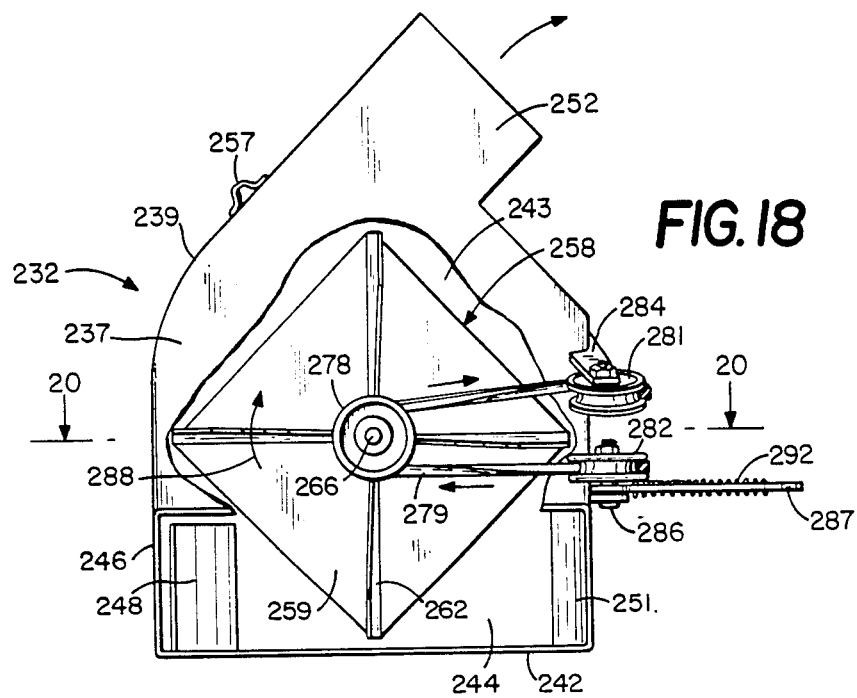
FIG. 18 is an enlarged sectional view taken along the line 18—18 with the blower wall broken away.
Figure 19:
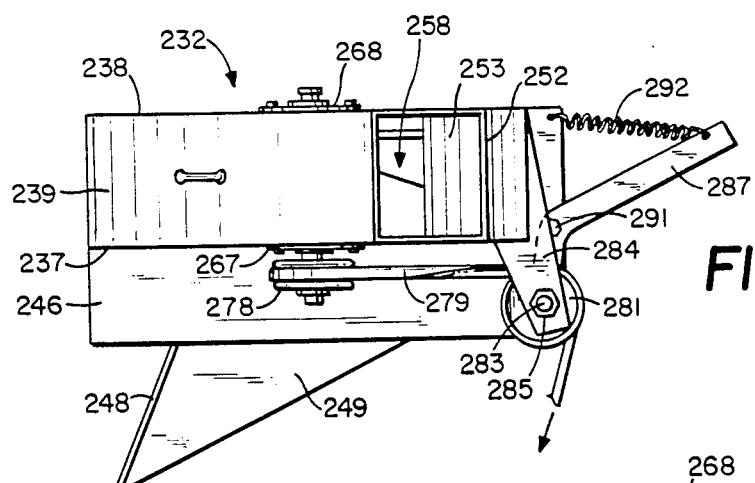
FIG. 19 is a top view of FIG. 18.
Figure 20:
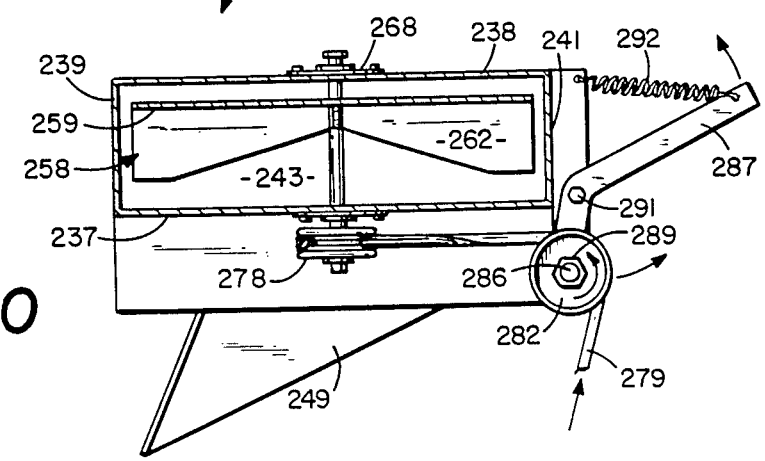
FIG. 20 is a sectional view taken along the line 20—20 of FIG. 18.
Figure 21:
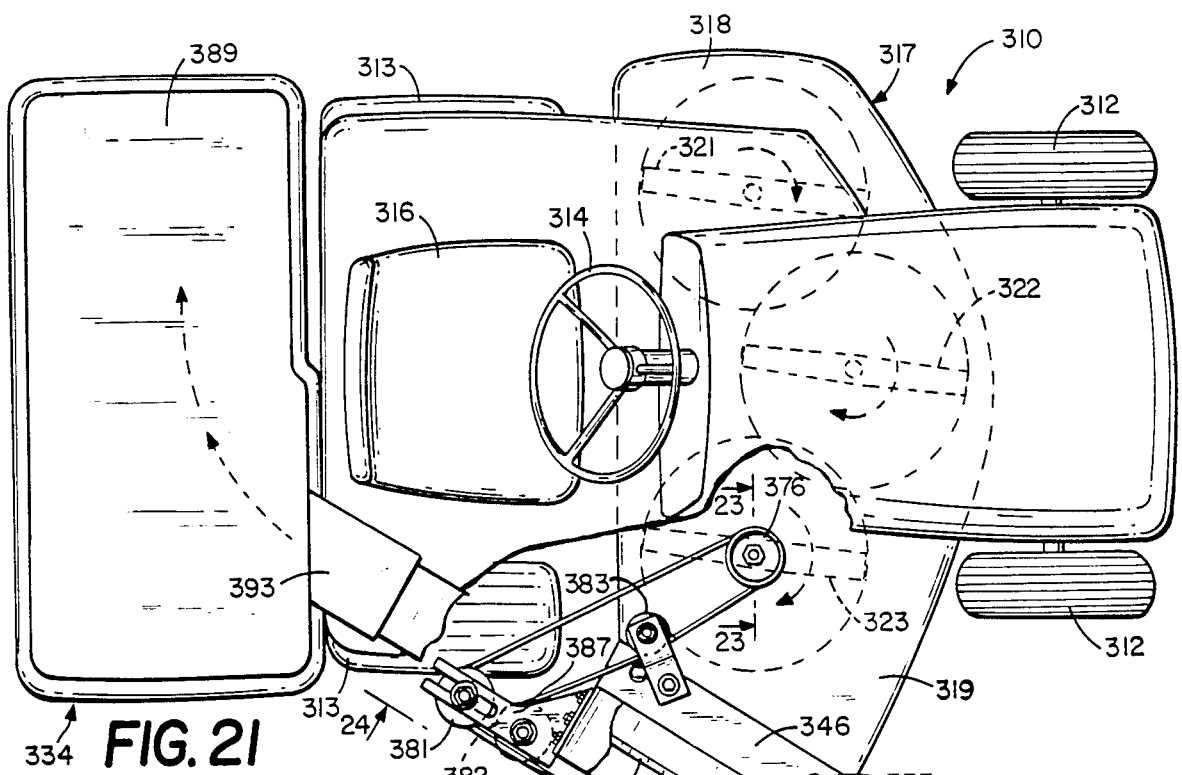
FIG. 21 is a plan view of a rotary lawn mower equipped with a section modification of the grass conveying collection apparatus of the invention.

Blower 232 includes an upright housing indicated generally at 236 located adjacent the discharge side of deck 218. Housing 236 has a pair of laterally spaced upright side walls 237 and 238, front and rear end walls 239 and 241, and a generally flat bottom wall 242 to provide an interior chamber 243. As shown in FIG. 18, side wall 237 has at its lower end a generally rectangular inlet opening 224. The bottom of opening 244 is defined by the flat bottom wall 242. Housing 236 has a lateral inwardly directed extension 246 surrounding the inlet opening 244. Extension 246 is a generally rectangular structure having an inlet passage 247 in communication which inlet opening 244. A flat inwardly directed deflector plate 248 is mounted on extension 246. As shown in FIG. 19, deflector plate 248 extends at an angle in a forward direction from extension 246. The bottom wall 242 has a generally triangular section 249 that is joined to the bottom of deflector plate 248. Deflector plate 248 fits into discharge section 219 and directs particulate material into the bottom of interior chamber 243. A second deflector plate 251 is located within extension 246 opposite deflector plate 248. Deflector plates 248 and 251 diverge outwardly or into chamber 243 to direct the particulate material through inlet opening 244 into the bottom of interior chamber 243.

The top of housing 236 has an upwardly and rearwardly directed discharge chute 252. Chute 252 has a discharge passage aligned with a tube 254 for carrying the particulate material to collector 234. As shown in FIG. 16, tube 254 telescopes over chute 252. A flexible cord 256 attached to tube 254 and hooked to a eye member 257 on housing 236 yieldably holds tube 254 on chute 252.

An impeller indicated generally at 258 is rotatably mounted on housing 236 within interior chamber 243. As shown in FIG. 18, impeller 258 has a square upright plate 259 located adjacent wall 236. Plate 25 has an impeller shaft 266 and a plurality of paddles 262, which extend from the center to the corners of plate 259. Paddles 262 are inclined in a forward direction relative to the plane of plate 259 toward inlet opening 244. Shaft 266 projects through holes in side walls 237 and 238 and is rotatably mounted on bearings 267 and 268 secured to the side walls. Impeller 258 is driven with a belt and pulley power transmission indicated generally at 269 from blade shaft 224. As shown in FIGS. 16 and 17, cover 231 is provided with a hole 271 which is located above blade shaft 224. A shaft extension 272 extends upwardly from blade shaft 224 through hole 271. The lower end of extension 272 has a threaded bore 273 to accommodate the threaded upper end 274 of blade shaft 224. The conventional nut is removed from the threaded end 274 and replaced with the shaft extension 272. A first pulley 276 is mounted on the upper end of shaft extension 272. Nut 277 secures pulley 276 to shaft extension 272. A second pulley 278 is mounted on the inner end of impeller shaft 266.

A single endless belt 279 is trained about the first and second pulleys 276 and 278 to transmit power from the extenion 272 to impeller shaft 266. Belt 279 rides over idler pulleys 281 and 282. As shown in FIG. 16, pulley 281 is rotatably mounted on a post 283 which extends through a downwardly inclined triangular support plate 284. The base of plate 284 is fastened with welds or the like to the blower housing 236. A nut 285 on top of post 283 is used to secure the post 283 to support plate 284. Pulley 281 is located rearwardly of blower pulley 278 and generally aligned with the top of pulley 278. Pulley 282 is inclined in a downwardly and inwardly direction and rotates about the upwardly and inwardly inclined axis of post 283. The inclined position of pulley 281 is shown in FIGS. 16 and 18. As shown in FIG. 19, the outer section of pulley 281 is longitudinally aligned with driven pulley 278 to ensure straight movement of belt 279 from pulley 278 to pulley 281. Belt 279 between pulley 278 and pulley 282 has a 90° twist. The inclined pulley 281 directs the upper run or pull run of belt 279 to drive pulley 276. Pulley 282 is rotatably mounted on a second upright post 286 which extends through a L-shaped bar or crankarm 287. A nut 289 on top of post 286 is used to secure post 286 to bar 287. Bar 287 is pivotally mounted on a linear support or plate 290. A nut and bolt assembly 291 pivotally mounts bar 287 to linear support 290 at the apex thereof. Support 290 is fastened to the rear of blower housing 236 directly beneath the support plate 284. A spring 292 is connected to support 290 and the outer end of bar 287 to bias bar 287 to maintain tension on the lower run of belt 279. The tension of belt 279 is maintained by the angular position of the L-shaped bar 287 determined by the biasing force of coil spring 292.

The upper run of belt 279 moves over inclined pulley 281 from the top of the second pulley 278 to the drive pulley 276. The lower run of belt 279 extends around pulley 282 to the bottom of the second pulley 278 and drive pulley 276. The belt and pulley power transmission 269 efficiently and effectively transmits power from the vertical blade shaft 224 to the horizontal impeller shaft 266. A shield, not shown, is used to enclose the belt and power transmission 269. Impeller 258 is driven in the direction of the arrow 288 to move air and particulate material from under mower deck 218 and discharge the material via tube 254 into material collector 234. Impeller 258 establishes a vacuum or suction that draws the particulate material into the interior chamber 243. The paddles 262 move the material through the chamber and discharge the material along with air into tube 254 leading to collector 234. The rotating impeller 258 also functions as a fly wheel to maintain the speed of rotation of the impeller 258 and rotating blades 221, 222, and 223.

In use, blower 232 operates concurrently with the rotation of cutting blades 221, 222, and 223. The internal combustion engine of tractor 210 delivers power to the drive shafts for the cutting blades including drive shaft 224. The belt and pulley transmission 269 operates to continuously transmit power from blade shaft 224 to blower shaft 266. The rotating blades 221, 222, and 223 and blower 232 move air through the space under the deck 218 and the blower 232. The grass under deck 218 is erected by the moving air and cut with the rotating blades 221, 222, and 223. Blower 232 establishes a suction or vacuum which draws the particulate material under deck 218 into the interior chamber 243 of blower housing 236. Impeller 258 picks up the particulate material from the lower portion of chamber 243, elevates the material, and discharges the material through spout 252 into tube 254. Tube 254 carries the material to collector 234.

The belt and pulley power transmission 269 transmits power from drive horizontal pulley 276 mounted on the upper end of the extension shaft 272 to driven vertical pulley 278 mounted on the inner end of impeller shaft 266. The vertical axis of rotation of pulley 276 is at right angles to the horizontal axis of rotation of impeller 266. The single endless belt 279 transmits the power from pulley 276 to impeller pulley 278. Belt 279 is trained about the idler pulleys 281 and 282. The idler pulleys 281 and 282 mounted on posts 283 and 286, respectively, are located in positions to maintain the alignment of the belt 279 with pulleys 276 and 278. This is achieved by rotatably mounting pulley 281 on the upper end of the post 283 on an axis that angles toward pulley 276 and rotatably mounting pulley 282 on post 286 coplaner with pulley 276. Pulley 281 has a cylindrical belt engaging face that is larger than the width of the belt whereby the belt runs at a slight angle relative to the cylindrical surface of pulley 281. This allows the belt to change elevation as it moves around pulley 281. The elongation and streach of belt 279 is compensated for by the spring biased crankarm 287. Coil spring 292 acting on crankarm 287 maintains tension on the lower run of belt 279.

FIGS. 21 to 26 show a third embodiment of the grass conveying and collection apparatus of the invention for use with a rotary lawn mower. A tractor 310 is equipped with a rotary lawn mower indicated generally at 317 having an inverted pan-shaped deck 318 located under frame 311 between front and rear wheels 312 and 313. Deck 318 has a side discharge section 319. A plurality of cutting blades 321,322, and 323 are located in the space below deck 318. Blades 321, 322, and 323 are mounted on upright shafts rotatably mounted with bearings (not shown) on deck 318. The shafts for the blades 321, 322, and 323 are drivably connected with an endless belt 329 to the power transmitting structure (not shown) operated by the internal combustion engine. The rotary lawn mower including the drive for the rotary cutting blades is conventional structure and does not form part of the invention.

Figure 23:
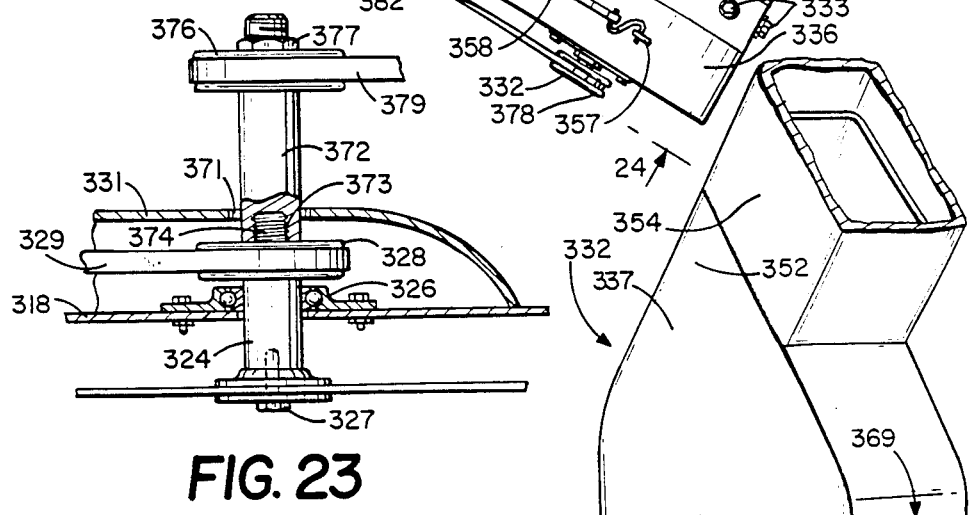
FIG. 23 is an enlarged sectional view taken along the line 23—23 of FIG. 21.

Referring to FIG. 23, upright blade shaft 324 is rotatably mounted on deck 318 with a bearing 326. A bolt 327 clamps blade 323 to the bottom of shaft 324. A pulley 328 accommodating endless mower drive belt 329 is attached to the top of shaft 324. A cover or shield 331 mounted on top of deck 318 encloses the belt and pulley drive for the upright blade shafts.

Returning to FIG. 21, a blower indicated generally at 332 is located adjacent the side discharge section 319. A plurality of nut and bolts 333 secure blower 332 to section 319. Blower 332 operates to draw particulate material, such as grass clippings and the like, from under deck 318 and discharge the particulate material into a material collector indicated generally at 334. Material collector 334 is mounted on the rear of the frame of the tractor 310 behind seat 316.

Figure 22:
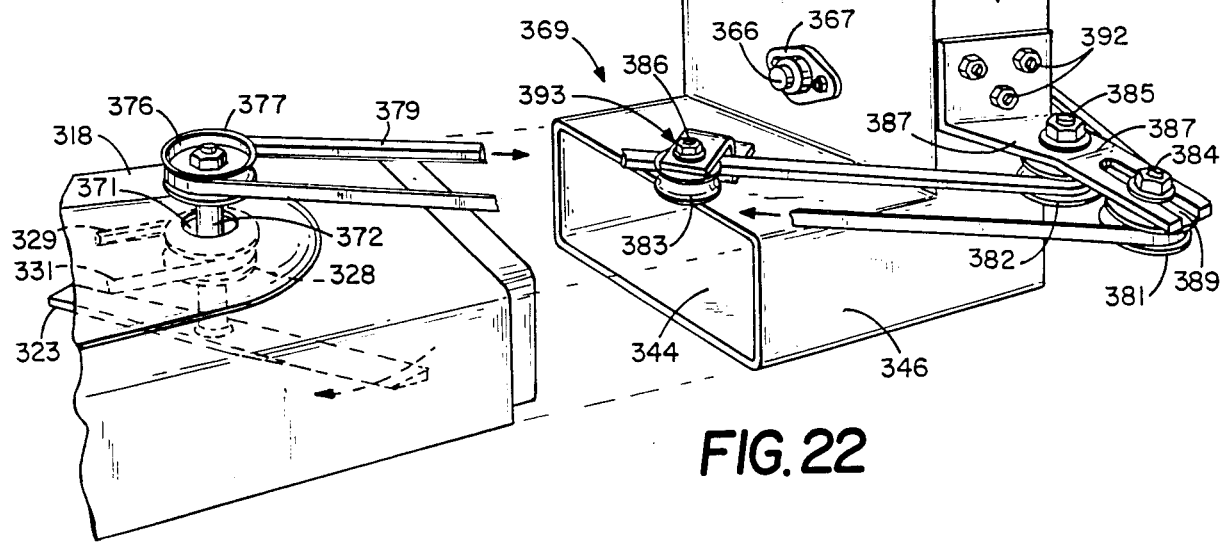
FIG. 22 is a exploded perspective view of the outlet section of the deck of the rotary lawn mower and the blower and drive for the blower of FIG. 21.
Figure 24:
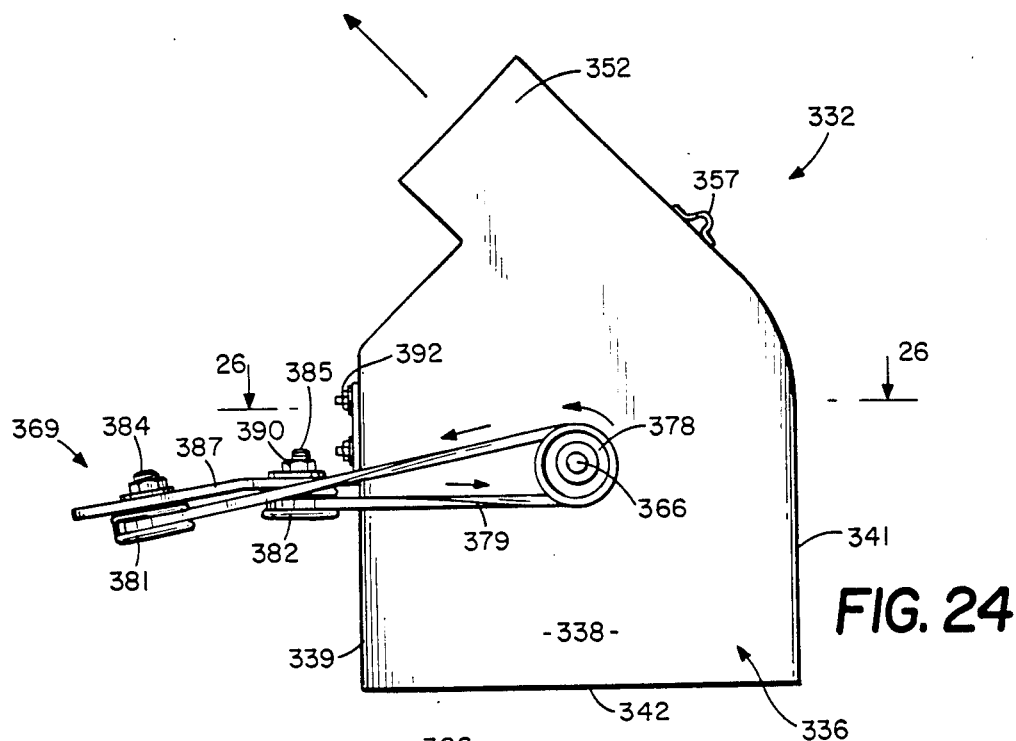
FIG. 24 is an outside elevational view of the blower.
Figure 25:
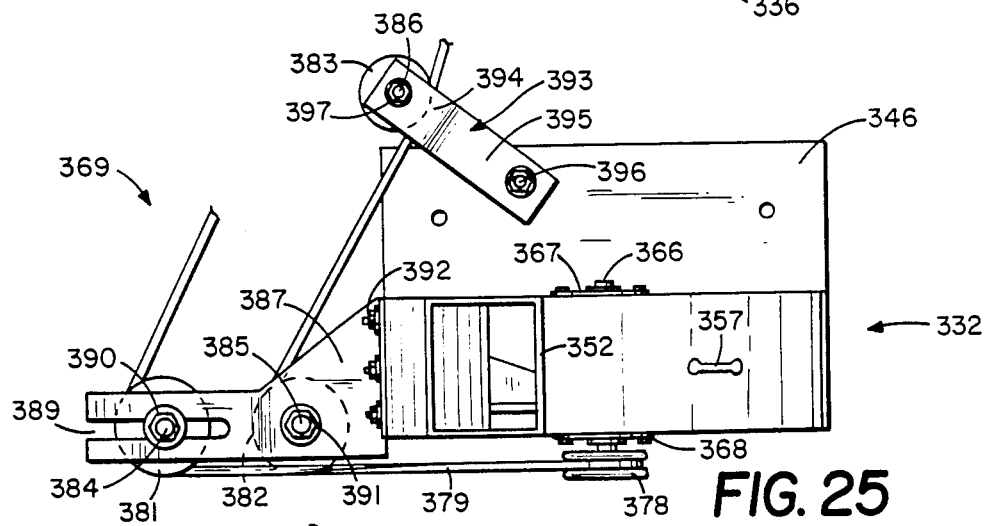
FIG. 25 is a top view of FIG. 24.

Blower 332 includes an upright housing indicated generally at 336 located adjacent the discharge side of deck 318. Housing 336 has a pair of laterally spaced upright side walls 337 and 338, front and rear end walls 339 and 341, and a generally flat bottom wall 342 to provide an interior chamber 343. Side wall 337 has at its lower end a generally rectangular inlet opening 344. The bottom of opening 344 is defined by the flat bottom wall 342. Housing 336 has a lateral inwardly directed extension 346 surrounding the inlet opening 344. Extension 346 is a generally rectangular structure having an inlet passage 347 in communication with inlet opening 344. A flat inwardly directed deflector plate 348 is mounted on extension 346. As shown in FIG. 25, deflector plate 348 extends at an angle in a forward direction from extension 346. The bottom wall 342 has a generally triangular section 349 that is joined to the bottom of deflector plate 348. Deflector plate 348 fits into the discharge section 319 and directs the particulate material into the bottom of interior chamber 343. A second deflector plate 351 is located within extension 346 opposite deflector plate 348. Deflector plates 348 and 351 diverge outwardly or into the chamber 343 to direct the particulate material through the inlet opening 344 into the bottom of interior chamber 343. The top of housing 336 has an upwardly and rearwardly directed discharge chute 352. Chute 352 has a discharge passage aligned with a tube 354 for carrying the particulate material to collector 334. As shown in FIG. 22, tube 354 telescopes over chute 352. A flexible cord 356 attached to tube 354 and hooked to a eye member 357 on housing 36 yieldably holds tube 354 on chute 352.

Figure 26:
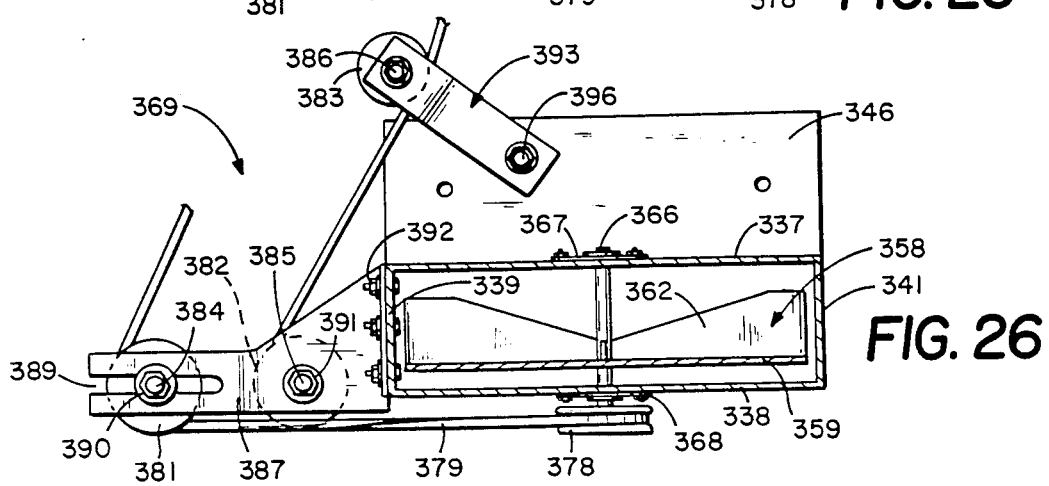
FIG. 26 is a sectional view taken along the line 26—26 of FIG. 24.

As shown in FIG. 26, an impeller indicated generally at 358 is rotatably mounted on housing 336 within interior chamber 343. Impeller 358 has a square upright plate 359 located adjacent wall 336. Plate 359 is secured to impeller shaft 366. A plurality of paddles 362 which extend from the center to the corners of plate 359. Paddles 362 are inclined in a forward direction relative to the plane of plate 359 and are directed toward inlet opening 344. Shaft 366 projects through holes in side walls 337 and 338 and is rotatably mounted on bearings 367 and 368 secured to the side walls. Impeller 358 is driven with a belt and pulley power transmission indicated generally at 369 from blade shaft 324. Cover 331 is provided with a hole 371 which is located above blade shaft 324. A shaft extension 372 extends upwardly from blade shaft 324 through hole 371. The lower end of shaft extension 372 has a threaded bore 373 to accommodate the threaded upper end 374 of blade shaft 324. The conventional nut is removed from the threaded end 374 and replaced with shaft extension 372. A first drive pulley 376 is mounted on the upper end of shaft extension 372. Pulley 376 is located in a horizontal plane. Nut 377 secures pulley 376 to shaft extension 372. A second driven pulley 378 is mounted on the outer end of impeller shaft 366. Pulley 378 is located in a vertical plane. A single endless belt 379 is trained about the first and second pulleys 376 and 378 to transmit power from the shaft extension 372 to impeller shaft 366. Belt 379 engages idler pulleys 381, 382, and 383 rotatably mounted on posts 384, 385, and 386, respectively. Post 384 is mounted on a bracket 387 having a rearwardly directed slot 389. As shown in FIG. 22, bracket 387 extends in a downward and rearward direction to incline post 384 away from the impeller pulley 378. Nut and bolt assemblies 392 secure bracket to the rear side of housing 336. A nut 390 on top of post 384 is used to secure the post 384 to bracket 387. Post 384 is adjustable along slot 389 to allow the operator to tension the belt 379. Post 385 is mounted on bracket 387 opposite slot 389 to horizontally align pulley 382 in the same plane as pulley 376. A nut 391 on the top of post 385 is used to secure post 385 to bracket 387 and to a L-shaped support bracket 387 fastened to blower housing 336. Post 386 is mounted on a second bracket 393 having parallel and opposite extending legs 394 and 395. Outwardly extending leg 394 accommodates post 386 to align pulley 383 in the same plane as pulleys 376 and 382. Inwardly extending leg 395 is fastened to blower extension 364 with a nut and bolt assembly 396. A nut 397 is used to couple post 386 with outer leg 394 of the second bracket 393.

The tension of belt 379 is adjusted by adjusting the position of post 384 on bracket 387. This is accomplished by loosening nut 390 and moving the post 384 on bracket 387 to apply tension to belt 379. Alternatively, the tension of the belt 379 can be adjusted by adjusting the angular position of second bracket 393 on blower extension 346. Nut 397 is loosened and bracket 393 is moved to apply tension to belt 379. The upper run of belt 379 moves over pulley 381 from the top of the impeller pulley 378 to the drive pulley 376. The lower run of belt 379 extends around pulleys 383 and 382 to the bottom of the impeller pulley 378. The belt and pulley power transmission 369 efficiently and effectively transmits power from vertical blade shaft 324 to the horizontal impeller shaft 366. A shield, not shown, is used to enclose the belt and power transmission 369. Impeller 358 is driven in the direction to move air and particulate material from under mower deck 318 and discharge the material via tube 354 into material collector 334. Impeller 358 establishes a vacuum or suction that draws the particulate material into the interior chamber 343. The paddles 362 move the material through the chamber and discharge the material along with air into the tube 354 leading to collector 334. The rotating impeller 358 also functions as a fly wheel to maintain the speed of rotation of the impeller 358 and rotating blades 321, 322, and 323.

In use, blower 332 operates concurrently with the rotation of cutting blades 321, 322 and 323. The internal combustion engine of tractor 310 delivers power to the drive shafts for the cutting blades including drive shaft 324. The belt and pulley transmission 369 operates to continuously transmit power from blade shaft 324 to blower shaft 366. The rotating blades 321, 322, and 323 and blower 332 move air through the space under the deck 318 and the blower 332. The grass under the deck 318 is erected by the moving air and cut with the rotating blades 321, 322, and 323. Blower 332 establishes a suction or vacuum which draws the particulate materials under deck 318 into the interior chamber 343 of the blower housing 336. Impeller 358 picks up the material from the lower portion of chamber 343, elevates the material, and discharges the material through spout 352 into the tube 354. Tube 354 carries the material to collector 334.

The belt and pulley power transmission 369 transmits power from the drive horizontal pulley 376 mounted on the upper end of the extension shaft 372 to the driven vertical pulley 378 mounted on the outer end of the impeller shaft 366. The vertical axis of rotation of pulley 376 is at right angles to the horizontal axis of rotation of the impeller 366. Endless belt 379 transmits the power from pulley 376 to the impeller pulley 378. The belt 379 is trained about the idler pulleys 381, 382, and 383. The idler pulleys 381, 382, and 383 mounted on posts 384, 385, and 386, respectively, are located in positions to maintain the alignment of the belt 379 with pulleys 376 and 378. This is achieved by rotatably mounting pulleys 381 on the upper end of the post 384 on axis that is inclined away from pulley 378 and rotatably mounting pulleys 382 and 383 on posts 385 and 386 to be coplaner with pulley 376. The pulley 381 has a cylindrical belt engaging face that is larger than the width of the belt whereby the belt runs at a slight angle relative to the cylindrical surface of pulley 381. This allows the belt to change elevation as it moves around pulley 381.

While there has been shown and described preferred embodiments of the grass conveying and collector apparatus including the blower and endless belt power transmission therefor and the grass collector, it is understood that changes in the apparatus may be made by those skilled in the art without departing from the invention. The invention is defined in the following claims.

The embodiments of the invention in which an exclusive property or privilege are claimed are defined as follows:

1. An apparatus for cutting grass and collecting grass clippings comprising: a tractor having an internal combustion engine, a rotary lawn mower having a generally horizontal deck mounted on the tractor, said deck having a grass clipping side discharge section having a discharge opening, a plurality of grass cutting blades located under said deck, means including upright blade shafts rotatably mounting the blades on the deck, drive means for transmitting power from the tractor engine to the blade shafts to rotate the blades whereby the blades cut grass under said deck and move grass clippings through said discharge opening, grass clippings collector means mounted on the tractor, and blower means for receiving grass clippings from said discharge opening and moving the grass clippings to the collector means, said blower means having housing with an internal chamber and an inlet opening aligned with the discharge opening, impeller means located within said chamber, a horizontal shaft rotatably mounting the impeller means on the housing for rotation about a generally horizontal axis, power transmission means drivably connecting the horizontal shaft with one upright blade shaft whereby power is transmitted from said one upright blade shaft to the impeller means to rotate the horizontal shaft, said deck having a hole above said one blade shaft, said power transmission means including an upright shaft extension extended through said hole and secured to said one blade shaft, a generally horizontal first pulley secured to said shaft extension, a generally vertical second pulley secured to said horizontal shaft, support means for a third pulley and a fourth pulley secured to the housing, post means rotatably mounting the third pulley on the support means for rotation about a generally upright first axis, means rotatably mounting the fourth pulley on the support means for rotation about a generally upright second axis, said third and fourth pulleys having outer belt accommodating portions generally aligned with the plane of rotation of the second pulley, and a single endless belt trained about said first and second pulleys and engageable with said third and fourth pulleys whereby said third and fourth pulleys change the orientation of the belt from horizontal to vertical and back to horizontal as the belt travels about said first and second pulleys whereby said belt transmits power from the first pulley to the second pulley to rotate the impeller means concurrently with the rotation of the blades.

2. The apparatus of claim 1 wherein: the support means comprises a first support secured to the housing, said post means being mounted on the first support, and a second support secured to the housing below the first support, and means mounting the fourth pulley on the second support.

3. The apparatus of claim 2 wherein: the means mounting the fourth pulley include means to bias the fourth pulley into engagement with the belt to maintain the tension thereof.

4. The apparatus of claim 2 wherein: the means mounting the fourth pulley on the second support includes a crankarm pivoted to the second support, a post rotatably mounting the fourth pulley on the crankarm, and biasing means connected to the crankarm to bias the crankarm in a direction to move said fourth pulley into engagement with the belt to maintain the tension thereof.

5. The apparatus of claim 2 wherein: the post means is inclined upwardly away from the housing whereby said third pulley is inclined to direct the belt toward the first pulley.

6. The apparatus of claim 1 wherein: said horizontal shaft has an outer end, said second pulley being secured to said outer end of the horizontal shaft.

7. The apparatus of claim 1 wherein: the support means comprises a bracket secured to said housing, said bracket having a downwardly extended outer end section, said means rotatably mounting the fourth pulley including a second post mounted on the outer end section of the bracket whereby said fourth pulley is inclined to direct the belt toward the first pulley.

8. The apparatus of claim 7 wherein: said outer end section has a longitudinal slot, said second post cooperating with said slot to adjust the position of the second post on the bracket thereby adjusting the tension of the belt.

9. The apparatus of claim 7 wherein: said post means is mounted on said bracket.

10. The apparatus of claim 7 wherein: said horizontal shaft has an outer end, said second pulley being secured to said outer end of the horizontal shaft.

11. An apparatus for use with a rotary lawn mower to collect grass clippings in a collector, said rotary lawn mower having a generally horizontal deck and a grass clipping side discharge section having a discharge opening, a plurality of grass cutting blades located under said deck, means including upright blade shafts rotatably mounting the blades on the deck, drive means for transmitting power from a power source to the blade shafts to rotate the blades whereby the blades cut grass under said deck and move grass clippings through said discharge opening, and a grass clippings collector means comprising: blower means for receiving grass clippings from said discharge opening and moving the grass clippings to the collector means, said blower means having a housing with an internal chamber and an inlet opening adapted to be aligned with the discharge opening, impeller means located within said chamber, a horizontal shaft rotatably mounting the impeller means on the housing for rotation about a generally horizontal axis, power transmission means for drivably connecting the horizontal shaft with one upright blade shaft whereby power is transmitted from said one upright blade shaft to the impeller means to rotate the impeller means, a generally horizontal first pulley secured to said one upright blade shaft, a generally vertical second pulley secured to the housing, support means for a third pulley and a fourth pulley secured to the housing, post means rotatably mounting the third pulley on the support means for rotation about a generally upright first axis, means rotatably mounting the fourth pulley on the support means for rotation about a generally upright second axis, said third and fourth pulleys having outer belt accommodating portions generally aligned with the plane of rotation of the second pulley, and a single endless belt trained about said first and second pulleys and engageable with said third and fourth pulleys whereby said third and fourth pulleys change the orientation of the belt from horizontal to vertical and back to horizontal as the belt travels about said first and second pulleys whereby said belt transmit power from the first pulley to the second pulley to rotate the impeller means concurrently with the rotation of the blades.

12. The apparatus of claim 11 wherein: the support means comprises a first support secured to the housing, said post means being mounted on the first support, and a second support secured to the housing below the first support, and means mounting the fourth pulley on the second support.

13. The apparatus of claim 12 wherein: the means mounting the fourth pulley includes means to bias the fourth pulley into engagement with the belt to maintain the tension thereof.

14. The apparatus of claim 12 wherein: the means mounting the fourth pulley on the second support includes a crankarm pivoted to the second support, a post rotatably mounting the fourth pulley on the crankarm, a biasing means connected to the crankarm to bias the crankarm in a direction to move said fourth pulley into engagement with the belt to maintain the tension thereof.

15. The apparatus of claim 12 wherein: the post means is inclined upwardly away from the housing whereby said third pulley is inclined to direct the belt toward the first pulley.

16. The apparatus of claim 11 wherein: said horizontal shaft has an outer end, said second pulley being secured to said outer end of the horizontal shaft.

17. The apparatus of claim 11 wherein: the support means comprises a bracket secured to said housing, said bracket having an outwardly extended outer end section, said means rotatably mounting the fourth pulley including a second post mounted on the outer end section of the bracket whereby said fourth pulley is inclined to direct the belt toward the first pulley.

18. The apparatus of claim 17 wherein: said outer end section has a longitudinal slot, said second post cooperating with said slot to adjust the position of the second post on the bracket thereby adjusting the tension of the belt.

19. The apparatus of claim 17 wherein: said post means is mounted on said bracket.

20. The apparatus of claim 17 wherein: said horizontal shaft has an outer end, said second pulley being secured to said outer end of the horizontal shaft.

21. An apparatus for use with a rotary lawn mower having a deck for moving grass clippings to a collection container, said lawn mower having at least one rotary grass cutting blade located below said deck, a generally upright first shaft rotatably mounted on the deck and secured to the blade, power means for rotating said first shaft thereby rotating the blade, said deck having a discharge opening along one side thereof, the improvement of: housing means adapted to be mounted on the deck adjacent said discharge opening, said housing means having an interior chamber and a lower portion having an inlet opening aligned with the discharge opening, means for securing said lower portion of the housing means to said deck, rotatable impeller means located within said chamber, horizontal shaft means rotatably mounting the impeller means on the housing means, said housing means having an upright discharge opening, means joining the housing means to the material collection container for carrying grass clippings from the discharge opening to the collection container, and drive means connected to said upright first shaft and said shaft means to rotate said impeller means concurrently with the rotation of the blade whereby said blade cuts grass and discharges grass clippings through said discharge opening into the inlet opening, said impeller means moving the grass clippings through the interior chamber and the means for carrying the grass clippings to the container, said drive means including generally horizontal first pulley means drivably connected to said first shaft, generally vertical second pulley means operatively connected to said shaft means, for a third pulley means and a fourth pulley means support means secured to the housing means, first means rotatably mounting the third pulley means on the support means for rotation about a generally upright first axis, second means rotatably mounting the fourth pulley means on the support means for rotation about a generally upright second axis, said third and fourth pulley means having outer belt accommodating portions generally aligned with the plane of rotation of the second pulley means, and endless belt means operative trained over said first, second, third, and fourth pulley means whereby said third and fourth pulley means change the orientation of the belt means from horizontal to vertical and back to horizontal as the belt means travels about said first and second pulley means whereby said belt means transmits power from the first pulley means to the second pulley means to rotate the impeller means concurrently with the rotation of the rotary grass cutting blade.

22. The apparatus of claim 22 wherein: the support means comprises a first support secured to the housing means, said first pulley means being mounted on the first support, and a second support secured to the housing means below the first support, and said second means mounting the fourth pulley means on the second support.

23. The apparatus of claim 22 wherein: the second means mounting the fourth pulley means includes means to bias the fourth pulley means into engagement with the belt to maintain the tension thereof.

24. The apparatus of claim 22 wherein: the second means mounting the fourth pulley means on the second support includes a crankarm pivoted to the second support, a post rotatably mounting the fourth pulley means on the crankarm, a biasing means connected to the crankarm to bias the crankarm in a direction to move said fourth pulley means into engagement with the belt to maintain the tension thereof.

25. The apparatus of claim 22 wherein: the first means includes a post inclined upwardly away from the housing means whereby said third pulley means is inclined to direct the belt means toward the first pulley means.

26. The apparatus of claim 21 wherein: said horizontal shaft means has an outer end, said second pulley means being secured to said outer end of the horizontal shaft means.

27. The apparatus of claim 21 wherein: the support means comprises a bracket secured to said housing means, said bracket having an outwardly extended outer end section, said second means rotatably mounting the fourth pulley means including a post mounted on the outer end section of the bracket whereby said fourth pulley means is inclined to direct the belt means toward the first pulley means.

28. The apparatus of claim 27 wherein: said outer end section has a longitudinal slot, said post on the bracket thereby adjusting the tension of the belt means.

29. The apparatus of claim 27 wherein: said first means is mounted on said bracket.

30. The apparatus of claim 27 wherein: said horizontal shaft means has an outer end, said second pulley means being secured to said outer end of the horizontal shaft means.

31. An apparatus for cutting grass and collecting grass clippings comprising: a tractor having an engine, a rotary lawn mower having a generally horizontal deck mounted on the tractor, said deck having a grass clipping side discharge section having a discharge opening, a plurality of grass cutting blades located under said deck, means including upright blade shafts rotatably mounting the blades on the deck, drive means for transmitting power from the tractor engine to the blade shafts to rotate the blades whereby the blades cut grass under said deck and move grass clippings through said discharge opening, grass clippings collector means mounted on the tractor, and blower means for receiving grass clippings from said discharge opening and moving the grass clippings to the collector means, said blower means having a housing with an internal chamber and an inlet opening aligned with the discharge opening, impeller means located with said chamber, a horizontal shaft rotatably mounting the impeller means on the housing for rotation about a generally horizontal axis extended laterally to the longitudinal axis of the tractor, power transmission means drivably connecting the horizontal shaft with one upright blade shaft whereby power is transmitted from said one upright blade shaft to the horizontal shaft to rotate the impeller means, a generally horizontal first pulley secured to said one upright blade shaft, a generally vertical second pulley secured to said horizontal shaft, support means for a third pulley and a fourth pulley secured to said housing, means rotatably mounting the third pulley on the support means for rotation about a first generally upright axis, means rotatably mounting the fourth pulley on the support means for rotation about a second generally upright axis, said third and fourth pulleys having outer belt accommodating portions generally aligned with the plane of rotation of the second pulley, and a single endless belt trained about said first and second pulleys and engageable with said third and fourth pulleys whereby said third and fourth pulleys change the orientation of the belt from horizontal to vertical and back to horizontal as the belt travels about said first and second pulleys whereby said belt transmits power from the first pulley to the second pulley to rotate the impeller means concurrently with the rotation of the blades, said impeller means moving grass clippings from the internal chamber of the housing to the grass clippings collector means.

32. The apparatus of claim 31 wherein: the support means comprises a first support secured to the housing and a second support secured to the housing, said third pulley being mounting on the first support and the fourth pulley being mounted on the second support.

33. The apparatus of claim 31 wherein: the means mounting the fourth pulley include means to bias the fourth pulley into engagement with the belt to maintain the tension thereon.

34. The apparatus of claim 31 wherein: the means mounting the fourth pulley on the support means includes a member moveably mounted on the support means and biasing means connected to the member to bias the member and retain the fourth pulley in engagement with the belt to maintain the tension thereof.

35. The apparatus of claim 31 wherein: said horizontal shaft has an outer end, said second pulley being mounted on said outer end of the horizontal shaft.

36. An apparatus for use with a rotary lawn mower having a deck for moving grass clippings to a collection container, said lawn mower having at least one rotary grass cutting blade located below said deck, generally first shaft rotatably mounted on the deck and secured to said cutting blade, power means for rotating said first shaft thereby rotating the cutting blade, whereby grass clippings are discharged from said deck through the discharge opening therein, the improvement of: housing means adapted to be mounted on the deck adjacent said discharge opening, said housing means having an interior chamber and a side wall with a lower portion thereof having an inlet opening aligned with the discharge opening of the deck, means for securing said housing means to said deck, rotatable impeller means located within said chamber, horizontal shaft means rotatably mounting the impeller means on the housing for rotation about a generally horizontal axis exended laterally relative to the longitudinal axis of the rotary lawn mower, said housing means having an upright discharge opening for directing material toward the collection container, and drive means connected to said upright first shaft and said horizontal shaft means to rotate said impeller means concurrently with the rotation of the blade whereby said blade cuts grass and discharges grass clippings through said discharge opening into the chamber of the housing means, said impeller means moving the grass clippings through said interior chamber and discharging the grass clippings toward the collection container, said drive means including generally horizontal first pulley means drivably connected to said first shaft, generally vertical second pulley means connected to said horizontal shaft means, support means for a third pulley means and a fourth pulley means secured to the housing means, means rotatably mounting the third pulley means on the support means for rotation about a first generally upright axis, means rotatably mounting the fourth pulley means on the support means for rotation about a second generally upright axis, said third and fourth pulley means having outer belt accommodating portions generally aligned with the plane of rotation of the second pulley means, and a single endless belt means operatively trained over said first, second, third, and foruth pulley means whereby said third and fourth pulley means change the orientation of the belt means from horizontal to vertical and back to horizontal as the belt means travels about said first and second pulley means whereby said belt means transmits power from the first pulley means to the second pulley means to rotate the impeller means concurrently with the rotation of the rotary grass cutting blade.

37. The apparatus of claim 36 wherein: the support means comprises a first support secured to the housing means, said first pulley means being mounted on the first support, and the second support secured to the housing means, and said fourth pulley means being mounted on the second support.

38. The apparatus of claim 36 wherein: the means mounting the fourth pulley means on the support includes means to bias the fourth pulley means into engagement with the belt to maintain the tension thereof.

39. The apparatus of claim 36 wherein: the means mounting the fourth pulley means on the support means includes a moveable member moveably mounted on the support means, and biasing means connected to the moveable member to bias the moveable in a direction to retain the fourth pulley means into engagement with the belt to maintain the tension thereof.

40. The apparatus of claim 36 wherein: said horizontal shaft means has an outer end, said second pulley means being mounted on said outer end of the horizontal shaft means.

* * * * *

UNITED STATES PATENT AND TRADEMARK OFFICE
CERTIFICATE OF CORRECTION

PATENT NO. : 4,693,063

DATED : September 15, 1987

INVENTOR(S) : Thomas L. HOepfner and Keith A. Leistikow

It is certified that error appears in the above-identified patent and that said Letters Patent is hereby corrected as shown below:

Column 3, line 48, after apparatus, add the word --is--.

Column 5, line 29, "Extenion" should be --Extension--.

Column 7, line 19, "screeen" should be --screen--.

Column 8, line 56, "224" should be --244--.

Column 9, line 18, "25" should be --259--.

Column 12, line 43, "364" should be --346--.

Column 15, line 48, "transmit" should be --transmits--.

Column 17, line 68 "with" should be --within--.

Signed and Sealed this

Twenty-sixth Day of April, 1988

Attest:

DONALD J. QUIGG

Attesting Officer     Commissioner of Patents and Trademarks